(12) United States Patent
Paré

(10) Patent No.: US 10,348,350 B2
(45) Date of Patent: Jul. 9, 2019

(54) TWO-WAY COMMUNICATION SYSTEM AND METHOD OF USE

(71) Applicant: Sonitus Technologies, Inc., San Mateo, CA (US)

(72) Inventor: Michael Paré, San Carlos, CA (US)

(73) Assignee: Sonitus Technologies, Inc., San Mateo, CA (US)

( * ) Notice: Subject to any disclaimer, the term of this patent is extended or adjusted under 35 U.S.C. 154(b) by 0 days.

(21) Appl. No.: 15/702,083

(22) Filed: Sep. 12, 2017

(65) Prior Publication Data

US 2018/0191389 A1 Jul. 5, 2018

Related U.S. Application Data

(60) Provisional application No. 62/398,390, filed on Sep. 22, 2016.

(51) Int. Cl.

| | | |
|---|---|---|
| *H04R 1/08* | (2006.01) | |
| *H04R 1/04* | (2006.01) | |
| *H04R 19/04* | (2006.01) | |
| *H04B 1/38* | (2015.01) | |
| *H04B 1/3827* | (2015.01) | |
| *H04B 5/00* | (2006.01) | |
| *H04B 5/02* | (2006.01) | |
| *H04R 1/10* | (2006.01) | |
| *A63B 71/08* | (2006.01) | |
| *H04M 1/725* | (2006.01) | |
| *G08B 3/10* | (2006.01) | |
| *G08B 21/02* | (2006.01) | |

(52) U.S. Cl.
CPC .......... *H04B 1/385* (2013.01); *A63B 71/085* (2013.01); *H04B 1/38* (2013.01); *H04B 5/0081* (2013.01); *H04B 5/02* (2013.01); *H04M 1/7253* (2013.01); *H04R 1/04* (2013.01); *H04R 1/1091* (2013.01); *H04R 19/04* (2013.01); *A63B 2225/50* (2013.01); *G08B 3/10* (2013.01); *G08B 21/02* (2013.01); *H04B 2001/3894* (2013.01); *H04R 1/08* (2013.01); *H04R 1/1041* (2013.01); *H04R 2201/003* (2013.01); *H04R 2420/07* (2013.01); *H04R 2460/13* (2013.01)

(58) Field of Classification Search
CPC ....... A61B 5/0002; A61B 5/05; A61B 5/6802; A61B 5/45
USPC .............................................. 455/66.1, 67.11
See application file for complete search history.

(56) References Cited

U.S. PATENT DOCUMENTS

| | | |
|---|---|---|
| 7,664,277 B2 | 2/2010 | Abolfathi et al. |
| 7,682,303 B2 | 3/2010 | Abolfathi |
| 7,724,911 B2 | 5/2010 | Menzel et al. |

(Continued)

OTHER PUBLICATIONS

"Advanced Two-Way Acoustic Communicator", by Carlson, K., Joint Interagency Field 1-17 Experimentation 16-1, Nov. 2-6, 2015. Entire document.

*Primary Examiner* — Simon Nguyen
(74) *Attorney, Agent, or Firm* — Levine Bagade Han LLP (57) ABSTRACT

The two-way communication system comprises a non-invasive and non-implanted system which remains completely invisible to an outside observer when in use by an operator or user and allows for clear two-way communications. This system is generally comprised of a mouthpiece component, relay component, infrastructure communication device, and an optional system control which may interface with the relay component.

29 Claims, 5 Drawing Sheets

(56) References Cited

U.S. PATENT DOCUMENTS

| | | |
|---|---|---|
| 7,796,769 B2 | 9/2010 | Abolfathi |
| 7,801,319 B2 | 9/2010 | Abolfathi |
| 7,844,064 B2 | 11/2010 | Abolfathi et al. |
| 7,844,070 B2 | 11/2010 | Abolfathi |
| 7,854,698 B2 | 12/2010 | Abolfathi |
| 7,876,906 B2 | 1/2011 | Abolfathi |
| 7,945,068 B2 | 5/2011 | Abolfathi et al. |
| 7,974,845 B2 | 7/2011 | Spiridigliozzi et al. |
| 8,023,676 B2 | 9/2011 | Abolfathi et al. |
| 8,150,075 B2 | 4/2012 | Abolfathi et al. |
| 8,160,279 B2 | 4/2012 | Abolfathi |
| 8,170,242 B2 | 5/2012 | Menzel et al. |
| 8,177,705 B2 | 5/2012 | Abolfathi |
| 8,224,013 B2 | 7/2012 | Abolfathi et al. |
| 8,233,654 B2 | 7/2012 | Abolfathi |
| 8,254,611 B2 | 8/2012 | Abolfathi et al. |
| 8,270,637 B2 | 9/2012 | Abolfathi |
| 8,270,638 B2 | 9/2012 | Abolfathi et al. |
| 8,291,912 B2 | 10/2012 | Abolfathi et al. |
| 8,295,506 B2 | 10/2012 | Kassayan et al. |
| 8,333,203 B2 | 12/2012 | Spiridigliozzi et al. |
| 8,358,792 B2 * | 1/2013 | Menzel ............ A61C 5/00 381/151 |
| 8,433,080 B2 | 4/2013 | Rader et al. |
| 8,433,082 B2 | 4/2013 | Abolfathi |
| 8,433,083 B2 | 4/2013 | Abolfathi et al. |
| 8,503,930 B2 | 8/2013 | Kassayan |
| 8,577,066 B2 | 11/2013 | Abolfathi |
| 8,585,575 B2 | 11/2013 | Abolfathi |
| 8,588,447 B2 | 11/2013 | Abolfathi et al. |
| 8,649,535 B2 | 2/2014 | Menzel et al. |
| 8,649,536 B2 | 2/2014 | Kassayan et al. |
| 8,649,543 B2 | 2/2014 | Abolfathi et al. |
| 8,660,278 B2 | 2/2014 | Abolfathi et al. |
| 8,712,077 B2 | 4/2014 | Abolfathi |
| 8,712,078 B2 | 4/2014 | Abolfathi |
| 8,795,172 B2 | 8/2014 | Abolfathi et al. |
| 8,867,994 B2 | 10/2014 | Kassayan |
| 9,113,262 B2 | 8/2015 | Abolfathi et al. |
| 9,143,873 B2 | 9/2015 | Abolfathi |
| 9,185,485 B2 | 11/2015 | Abolfathi |
| 9,247,332 B2 | 1/2016 | Kassayan et al. |
| 2008/0019542 A1 | 1/2008 | Menzel et al. |
| 2008/0267431 A1 | 10/2008 | Leidl et al. |
| 2009/0149722 A1* | 6/2009 | Abolfathi ............ A61B 5/0002 600/301 |
| 2011/0319021 A1 | 12/2011 | Proulx et al. |
| 2012/0041298 A1 | 2/2012 | Mersky |
| 2013/0211270 A1* | 8/2013 | St. Laurent ............ A61B 5/682 600/508 |
| 2014/0188010 A1* | 7/2014 | Paris .................... A61B 5/1126 600/595 |
| 2014/0312834 A1* | 10/2014 | Tanabe .................... H02J 7/025 320/108 |
| 2015/0044968 A1 | 2/2015 | Howard |
| 2015/0305671 A1* | 10/2015 | Yoon ........................ A61B 5/01 600/301 |
| 2017/0070797 A1* | 3/2017 | Spector ................ H04R 1/028 |
| 2018/0000563 A1* | 1/2018 | Shanjani ................ A61C 7/002 |
| 2018/0153469 A1* | 6/2018 | Yoon .................... A61B 5/4557 |

* cited by examiner

TWO-WAY COMMUNICATION SYSTEM AND METHOD OF USE

CROSS-REFERENCE TO RELATED APPLICATION

This application claims priority to U.S. Provisional Application No. 62/398,390 filed Sep. 22, 2016, which is herein incorporated by reference in its entirety for all purposes.

FIELD OF THE INVENTION

Systems, devices and methods for two-way communication are disclosed. More specifically, systems, devices and methods for two-way communication are disclosed that have a mouthpiece component positionable within a mouth of a user.

BACKGROUND OF THE INVENTION

Covert operations necessitate communication systems with very specific and stringent requirements. Such operations typically require clear two-way communications systems which are not visible or minimally visible to an outside observer, that allow for complete audio awareness of the environment, and which can be utilized in a less than overt manner.

Current technology has not been able to completely meet these requirements as existing systems invariably include some small visible component observable to a perceptive onlooker. Current communication systems also suffer from an inability to effectively communicate the user's speech when in very loud environments due to poor signal to noise ratio.

Accordingly, there is a need for a communication system that fully meets the stringent requirements of covert operations and allows for clear audio transmissions even in high noise situations.

BRIEF SUMMARY OF THE INVENTION

The present disclosure relates generally to two-way communication systems having a mouthpiece component positionable within a mouth of the user.

The communication system disclosed allows the operator or user to hear their environment by leaving their hearing unobstructed and thereby enables complete audio situational awareness by the operator.

Generally, one variation of a two-way communication system may comprise a mouthpiece component having a housing which is configured for temporary securement upon a tooth or teeth of a user, the housing having an integrated antenna with one or more loop coils arranged (e.g., symmetrically or asymmetrically) within the housing. An infrastructure communication device which is configured to transmit or receive signals from the mouthpiece component and communicate with a remote communication device may also be included, as well as a relay component in communication with the mouthpiece component and which is configured to interface between the mouthpiece component and the infrastructure communication device.

In another variation, the two-way communication system may also comprise a system control which is in communication with the relay component and which is also configured to wirelessly provide an input to the relay component.

BRIEF DESCRIPTION OF THE DRAWINGS

The drawings shown and described are exemplary embodiments and non-limiting. Like reference numerals indicate identical or functionally equivalent features throughout.

DETAILED DESCRIPTION

Systems, devices and methods for two-way communication are disclosed that can provide reliable and/or clear incoming and/or outgoing communication. The systems, devices and methods disclosed can provide reliable and/or clear communication in any environment, for example, low noise environments, medium noise environments, high noise environments, or any combination thereof. The systems, devices and methods disclosed can be adjusted in real-time, manually or automatically, to advantageously function in one or multiple environments that have, for example, dynamic noise conditions.

The systems, devices and methods disclosed can be partially or completely visible or invisible to an outside observer when in use by an operator or user. For example, one or multiple components of the systems, devices and methods disclosed—including the entire system—can be partially or completely visible or invisible, for example, to another person, an image capturing system (e.g., a camera- or video-based surveillance system), or any combination thereof.

The communication systems disclosed can be non-invasive systems, invasive systems, non-implanted systems, implanted systems, or any combination thereof. For example, the communication systems disclosed can be non-invasive and non-implanted systems.

The communication systems disclosed can allow for clear two-way half-duplex and/or full-duplex communications.

The systems disclosed can allow the operator or user to hear their environment by leaving their hearing unobstructed and thereby enable complete audio situational awareness by the operator. With the addition of hearing protection, the same systems instantly convert into complete tactical and general purpose communication systems, functional in high noise environments.

One aspect of the systems disclosed is the use of an in-mouth communication device (also referred to as a mouthpiece component) utilizing bone conduction driven into the teeth for received audio, and an integrated microphone as part of the mouthpiece component. For example, the mouthpiece component can have one or multiple mouthpiece microphones. The mouthpiece microphone(s) can be attached to or integrated with the mouthpiece component.

Using the in-mouth communication device, the operator may leave the ears completely open and unobstructed to enable the user to be situationally aware. Clear communications are possible while eliminating all cables and headsets.

The communication systems disclosed are particularly well suited for low-visibility applications as all parts of the system may either be hidden under clothes or are otherwise not visible to an external observer. For loud environments where in-ear or on-ear hearing protection is warranted or otherwise desirable, the same communication systems may be used as a general purpose and/or tactical communication system by incorporating hearing protection. This not only provides safety for the user, but also allows for reduced external noise competition for the user's attention, such that incoming audio communications may be heard and understood with more clarity. Furthermore, having the microphone embedded in the mouthpiece component enables extremely good noise shielding capabilities such that clear outgoing audio transmissions are possible even in loud environments (e.g., deafeningly loud environments). In cases where hearing protection is acceptable, the system may also be used as a general purpose communication system.

Figure 1:
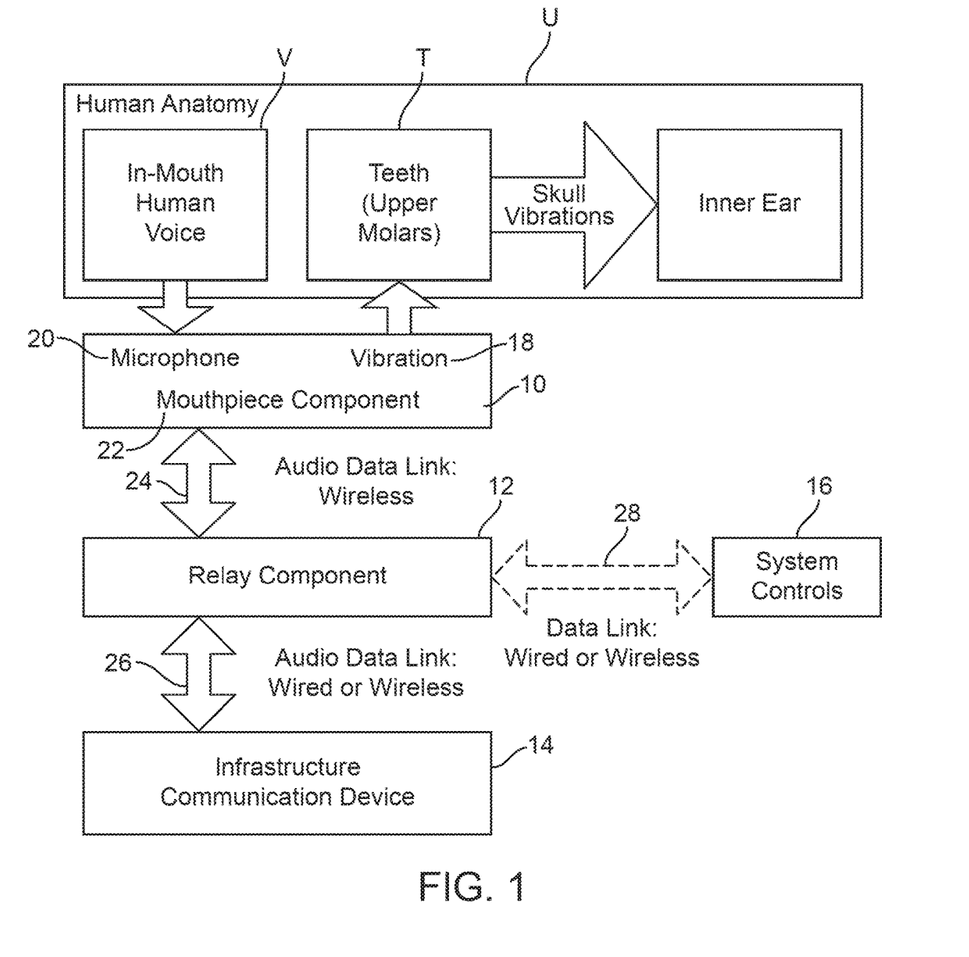
FIG. 1 shows a schematic representation of a variation of a two-way communication system having a mouthpiece component, a relay component, an infrastructure communication device, and/or a system control.

The system can have (a) a mouthpiece component 10, (b) a relay component 12, (c) an infrastructure communication device 14, (d) system controls 16, or any combination thereof. For example, FIG. 1 illustrates that the system can have (a) a mouthpiece component 10, (b) a relay component 12 and (c) an infrastructure communication device 14. As another example, FIG. 1 illustrates that the system can have (a) a mouthpiece component 10, (b) a relay component 12, (c) an infrastructure communication device 14 and (d) system controls 16. The system controls 16 may interface with the relay component 12, as shown in the schematic diagram of FIG. 1.

Variations of individual system components are detailed below, including different options for embodiments and particular design attributes.

Mouthpiece Component

The mouthpiece component 10 removably attaches or clamps onto or around the molars, e.g., upper back molars, of the operator or user U and allows for normal speech, eating, and drinking without impediment. Additionally, the mouthpiece component 10 may be temporarily secured to the user's tooth or teeth without having to alter the user's dentition in any way such that the user may simply remove the component 10 from the tooth or teeth when finished, leaving the dentition unaltered. When the mouthpiece component 10 is to be used again, it may be simply reinserted within the mouth and secured to the tooth or teeth again. The mouthpiece component 10 also utilizes bone-conduction technology by actuating one or more transducers 18 incorporated into the mouthpiece component 10 and vibrationally coupled to the teeth T to convey incoming audio to the user, as indicated by the vibrational conductance. The mouthpiece component 10 also integrates a microphone assembly 20 to capture the user's speech V for outgoing audio transmissions. The mouthpiece component 10 may also incorporate a transmitter and/or receiver such as a transceiver 22 which enables wireless communication 24 with the relay component 12 to receive and transmit audio data.

The mouthpiece component 10 may be comprised of a low-profile housing configured for temporary securement within the mouth and upon the tooth or teeth of the operator. This mouthpiece component 10 utilized may be described in further detail in any one of the following patent references: U.S. Pat. Nos. 7,664,277; 7,682,303; 7,724,911; 7,796,769; 7,801,319; 7,844,064; 7,844,070; 7,854,698; 7,876,906; 7,945,068; 7,974,845; 8,023,676; 8,150,075; 8,160,279; 8,170,242; 8,177,705; 8,224,013; 8,233,654; 8,254,611; 8,270,637; 8,270,638; 8,291,912; 8,295,506; 8,333,203; 8,358,792; 8,433,080; 8,433,082; 8,433,083; 8,503,930; 8,577,066; 8,585,575; 8,588,447; 8,649,535; 8,649,536; 8,649,543; 8,660,278; 8,712,077; 8,712,078; 8,795,172; 8,867,994; 9,113,262; 9,143,873; 9,185,485; 9,247,332. These patent references are incorporated herein by reference in their entirety and for any purpose herein.

The wireless link 24 between the mouthpiece 10 and relay component 12 is utilized in order to get audio data into and out of the mouth area may utilize any number of wireless data transmission protocols, e.g., near field magnetic induction (NFMI), radio frequency (RF) link such as BLUETOOTH®, body conduction, or acoustic signals at or above human hearing. Utilizing NFMI is generally preferable to RF due to reduced attenuation through body tissue and also due to a reduced electromagnetic far field profile. Regardless of wireless link implementation, the data can be encrypted to ensure security using, e.g., AES-256 or other encryption standards.

Figure 2:
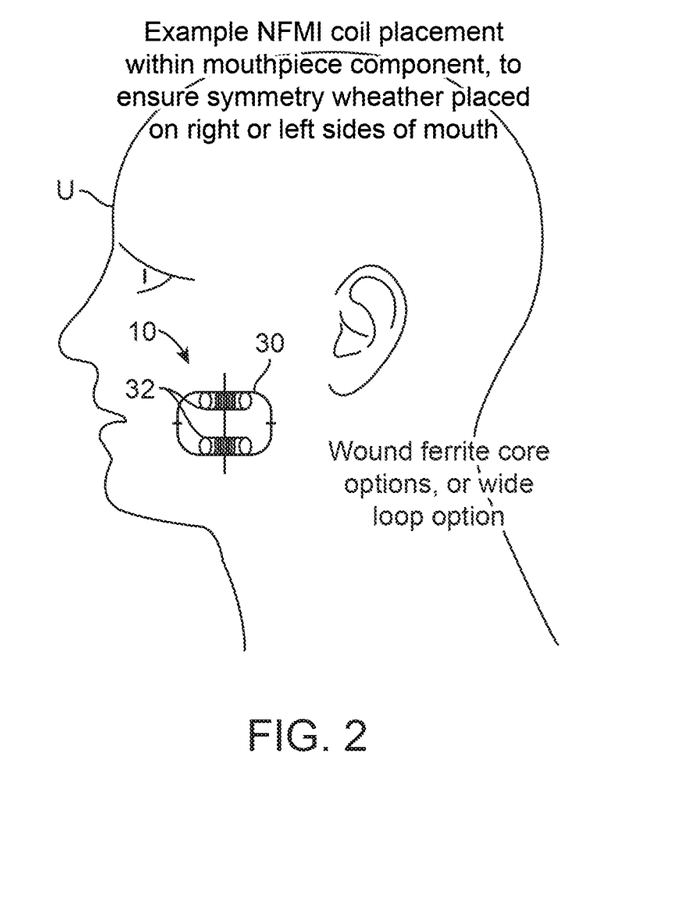
FIG. 2 shows a variation of a mouthpiece component having an integrated NFMI antenna/coil.

The mouthpiece component 10 can have an antenna (also referred to as a sensing mechanism) to receive signals/data (e.g., from the relay component 12). The sensing mechanism can be attached to or integrated with the mouthpiece component 10. The sensing mechanism can desirably allow the mouthpiece component 10 to receive data without a wire and can be, for example, a transducer, electrode, or other sensing mechanism that can function as an antenna. For example, the mouthpiece component 10 can receive data via body conducted signals (such that the body is the sensing mechanism, for example, the body can be an electrode), via acoustic signals sent at or above human hearing to a piezo transducer, via electromagnetically with an RF antenna, via a magnetic field with a loop/coil antenna. For example, using NFMI for the wireless link means the mouthpiece 10 is utilizing an integrated NFMI antenna/coil 32, as shown in FIG. 2. This may be completed through either a wire-wound ferrite core antenna or a wide loop option such as a larger loop coil 30. Regardless of implementation, one design consideration is the ability of the mouthpiece component 10 to work similarly whether placed on the right or left upper molars, as different users may require different sides depending on dental anatomy. This means NFMI coil/antenna 32 placement preference is somewhere symmetric, such as along the bottom or top edge of the mouthpiece 10.

The integrated microphone 20 capability in the mouthpiece component 10 may be implemented with either, e.g., a MEMS-type air microphone or a PVDF film type vibrational sensor, as described in further detail below.

Figure 3A:
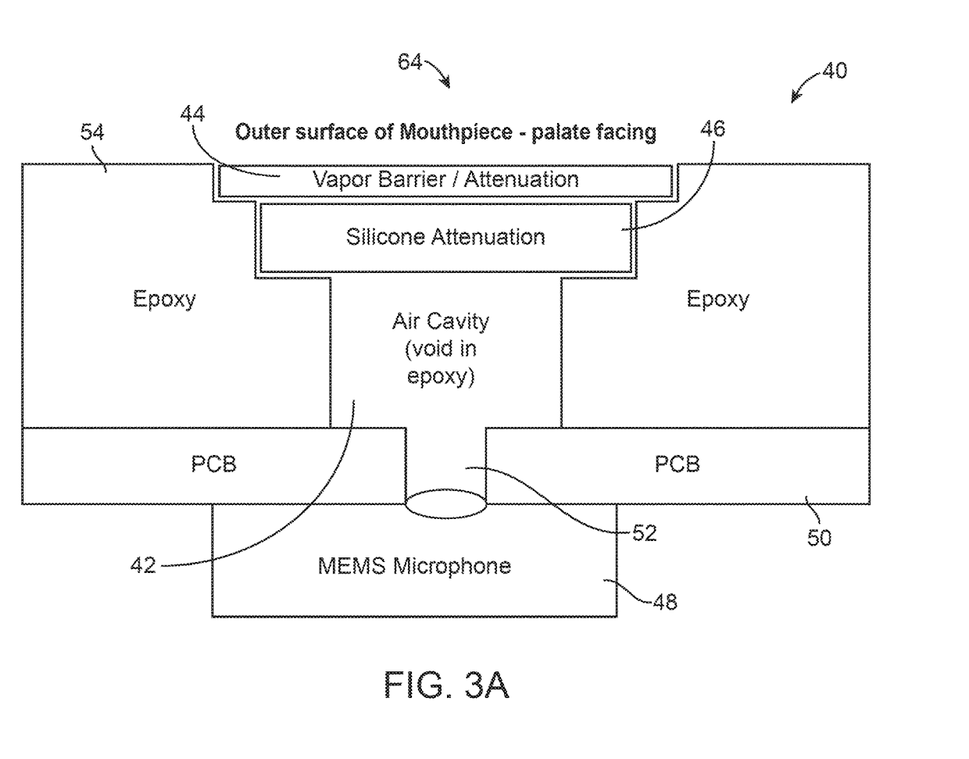
FIG. 3A shows a partial cross-sectional illustration of a variation of a MEMS-type microphone assembly securable within a user's mouth.

For a MEMS type microphone assembly 40, as shown in the partial cross-sectional illustration of FIG. 3A, the in-mouth sound pressure levels are high (e.g., up to ~150 dBSPL) necessitating audio attenuation as part of the microphone assembly to prevent clipping and distortion. MEMS type microphones also typically utilize the presence of a small air cavity 42, so this implementation may include a waterproof barrier 44 such as a tape or film as well as an attenuation element 46 such as a silicone disk, as part of the audio path to the air cavity 42 created for the microphone 48. The air cavity 42 may be formed in part by a first substrate 50, e.g., PCB defining an opening or channel 52 to the MEMS microphone 48, and a second substrate 54, e.g., housing structure formed from a material such as epoxy, which may form the sidewalls of the air cavity 42. The attenuation element 46 may be mounted upon the second substrate 54 along with the barrier 44 positioned upon the attenuation element 46 and the second substrate 54, as shown. The portion of the assembly 40 upon which the barrier 44 is positioned may be positioned adjacent to the outer surface of the mouthpiece component 10, e.g., facing the palate of the user.

In order to handle the limited dynamic range of typical conventional MEMS microphones, the attenuation 46 added as part of the assembly 40 may be typically selected to still allow normal as well as low-voice speech levels, but enough attenuation such that loud talking or yelling will not be distorted, e.g., attenuation on the order of −30 dB is sufficient to prevent audio clipping. A good system level compromise will allow some distortion and clipping of sound pressure levels corresponding to the user screaming. This ensures the lower-end of the dynamic range will accept light talking down to whisper level audio.

The placement of the audio port 64 for a MEMS microphone 48 is desirably placed on a surface of the mouthpiece 10 which faces the palate, as this position is stable, is exposed to the highest speech sound levels, and does not get impacted by tongue and cheek movements during speech which can give rise to undesired audio artifacts. A tooth-facing position is also an acceptable alternative. It should be noted that due to an in-mouth MEMS microphone placement, the user's speech is loud so the signal-to-noise ratio (SNR) is large. External noise sources are dampened not only by the user's own cheeks and dental anatomy, but by the attenuation of the microphone assembly 40. This allows for clear recorded voice audio, down to whisper level, even in very loud external noise environments.

The microphone capability of the mouthpiece may also be implemented using, e.g., a polyvinylidene fluoride or polyvinylidene difluoride (PVDF) film vibrational sensor. This technique utilizes amplification circuitry to process the small signals output from the piezo-electric film material, as well as electrical shielding techniques to help reduce noise. The PVDF film material may be placed on an interior section of the mouthpiece enclosure, to pick up vibrations of the enclosure itself, as long as the film is backed either by air or a flexible material. Benefits of the PVDF film implementation may include a reduced implementation volume as well as inherently good noise shielding from the external environment as air-based incoming sound impinging on the user does not give rise to large physical vibrations inside the user's mouth. Both microphone implementation methods, therefore, provide the ability to issue clear audio transmissions with good SNR even in cases where the user is unable to hear themselves talk due to environmental noise conditions.

The mouthpiece 10 desirably provides a physical vibration drive onto the teeth to implement the bone conduction audio path previously described. This may be accomplished by using a piezo-electric material, e.g., with a piston-type interface to translate the small vibrations onto the surface of the tooth or teeth. Previous disclosures have detailed this interface and potential architecture options, as incorporated herein above, including simple beam with weights to reduce the mechanical resonant frequency, as well as a cantilever type configuration to again help lower the resonant frequency and also reduce the mechanical source impedance of the device to better translate power to the tooth. Additionally or alternatively, the mouthpiece 10 can have two actuators, located on either side of the mouth (e.g., both located on the left or right side of the mouth, or one located on the left side and one located on the right side), and provide "3D" or "directional" audio by slight timing differences/phasing between the two actuators. This can help to tell the difference between incoming audio from different radio sources in the case where the relay component 12 is connected to multiple infrastructure communication devices 14 at once. Additionally or alternatively, the mouthpiece component can be designed such that one actuator (e.g., a first actuator) can be on a left side of the mouth and such that one actuator (e.g., a second actuator) can be on a right side of the mouth. Additionally or alternatively, the mouthpiece component 10 can have multiple actuators located on one or both sides of the mouth (e.g., one actuator on a left side and two actuators on a right side).

The mouthpiece component 10 can be powered without a battery source. For example, the mouthpiece component 10 can be powered through the oscillations of a magnetic field as a means of live power transfer. For example, the mouthpiece component 10 can be powered with a wireless power transfer system. In this way, the mouthpiece component 10 can be a "passive" component without a battery source. Alternatively or additionally, the mouthpiece component 10 can have an internal power source. This may either include a replaceable battery or integrated rechargeable battery. The use of a rechargeable battery may allow the system to remain sealed and waterproofed without having to incorporate a separate waterproof compartment to allow for battery replacement. The method of recharging the internal battery may be either contact charging through exposed metal contact pins on the mouthpiece external surface, or through a wireless inductive or resonant charging technique. The wireless methods may allow for complete mouthpiece component sealing and less risk of leaks and fluid ingress. In order to make the inductive charging work for a device small enough to be worn in the mouth, certain design aspects may include creating a very tight coupling between the charger transmit coil and the mouthpiece receive coil. Distance between those coils are desirably minimized through design, and ferrite sheet backing material used to help reduce heat and again increase the coupling coefficient. The device is relatively small enough that a custom transmit coil made to match and align with the mouthpiece recharge coil is advantageous.

The mouthpiece component 10 enclosure itself is desirably physically small but also very strong in order to ensure the internal components and battery are protected and safe even under potential bite-force of the user. To this end, the circuitry and battery may be encapsulated, e.g., with epoxy 54, as part of the design such that all of the potentially hazardous materials are completely encased in a bio-compatible material such as that used in pacemaker headers. A typical implementation would include the epoxy filling 54 of a bio-compatible plastic enclosure, but to reduce size even further the plastic enclosure may be skipped altogether and the epoxy 54 may be molded around the electronics in the desired component shape. This allows for tight control and small dimensions for the gap to a recharge coil, for instance. It also allows for the ability to create a small MEMS microphone air cavity 42 through the use of core pins during the epoxy mold process. This air cavity 42 may then be integrated with the aforementioned acoustic attenuation components. Top or bottom port MEMS microphones can be used along with this method.

Figure 3B:
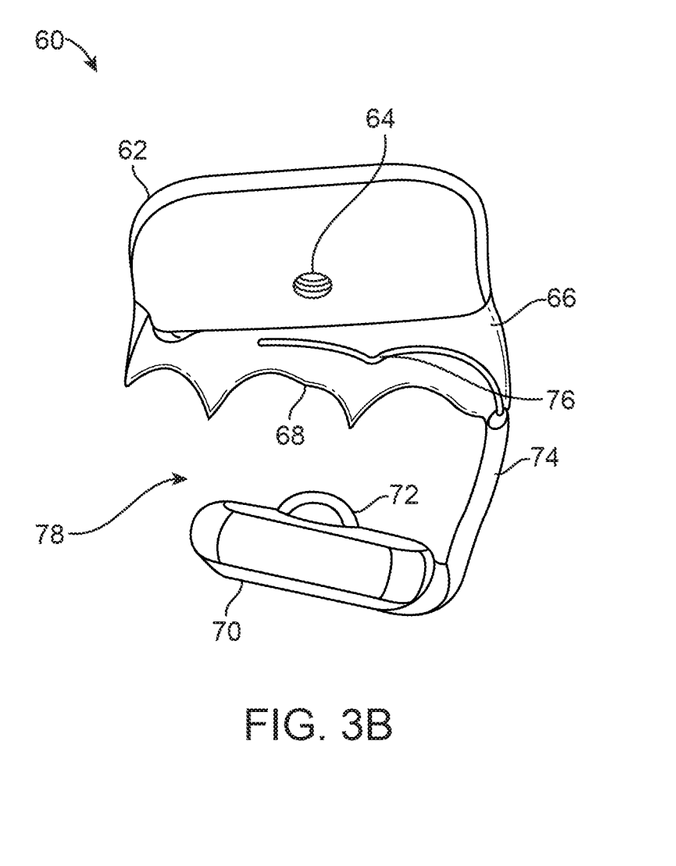
FIG. 3B shows a perspective assembly view of variation of the mouthpiece component of FIG. 1 that is securable within the mouth and upon one or more teeth of a user.

Lastly, the mouthpiece component 10 may be clamped to the user's tooth or teeth, e.g., upper back molars, using some clamping and fit mechanism, as illustrated in the perspective view of the mouthpiece component 60 shown in FIG. 3B. This is best done by having some portion of the mouthpiece be user-specific, and custom to their dental anatomy, to ensure the best clamp/retaining force, and to optimize comfort. The customized-portion of the mouthpiece may either be integrated into the mouthpiece assembly 10 as a single custom piece, or it may be separable such that the dental-adapter to the individual may be constructed separately than the mouthpiece electronics package, and the two parts mate together to create the overall mouthpiece system component.

As shown, the mouthpiece component 60 may include the microphone assembly housing 62 having a size configured for unobtrusively positioning within the user's mouth for extended periods of time, e.g., along the lingual or buccal surface(s) of one or more teeth, placed against the palate. The housing 62 may have a length of, e.g., 25 mm, and a height of, e.g., 15 mm, with the audio port 64 for a MEMS microphone (contained within the housing 62) defined along the side of the housing 62. The audio port 64 may be defined along the side of the housing 62 facing towards the palate when the component 60 is secured within the mouth, but in other variations, the audio port 64 may be defined at other locations such that it faces the teeth (either lingual or buccal surface) or the inner surface of the user's cheek.

In either case, the housing 62 may have a first portion of a conformable securement member 66, e.g., dental acrylic, attached along the side of the housing while a second portion of the conformable securement member 66 may define an interface 68 which is conformable to the patient's underlying dentition. Alternatively, the second portion of the conformable securement member 66 may instead be formed into a simplified configuration which is atraumatic and positionable against a variety of dentition. An actuator housing 70 having a contact portion 72 for placement against the surface(s) of the one or more teeth (e.g., within the interproximal space between teeth) may be positioned in apposition to the interface 68 such that a receiving region 78 is formed between the two within which the one or more teeth may be positioned.

The actuator housing 70 may contain at least some of the electronics and one or more actuators which are configured to vibrate according to the signals received for transmitting auditory signals via vibrational conductance into the underlying surfaces of the one or more teeth in contact with the contact portion 72. The actuator housing 70 and contact portion 72 may be maintained in its position relative to the housing 62 via a connecting member 74, e.g., hypotube, which has an embedded portion 76 secured or otherwise attached within or to conformable securement member 66. The connecting member 74 may be flexible enough to allow the actuator housing 70 and assembly housing 62 to temporarily flex away from one another during securement of the assembly 60 upon the user's dentition as the tooth or teeth are positioned within the receiving region 78.

Yet when suitably positioned, the actuator housing 70 and contact portion 72 may clamp or otherwise become secured against the tooth or teeth, e.g., via an interference fit between the assembly 60 and the surfaces of the user's tooth or teeth. The connecting member 74 may be positioned, e.g., to extend proximally around the distal surface (i.e., opposite of the mesial surface) of the last positioned molar (i.e., third molar) so that the occlusal surfaces of the tooth or teeth remain free and unobstructed by the assembly 60.

Relay Component

Figure 4A:
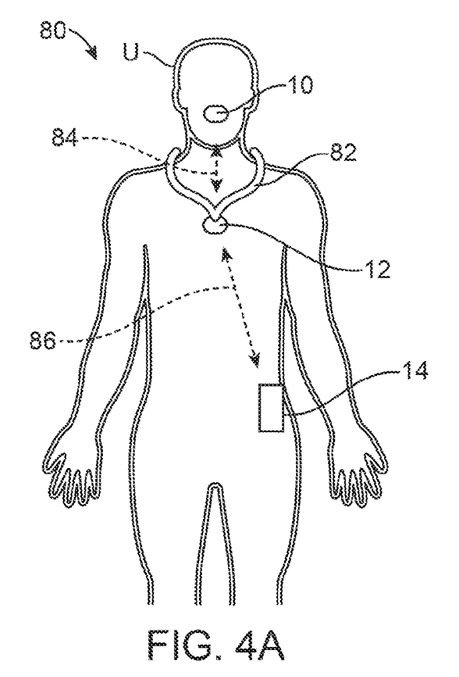
FIGS. 4A and 4B show schematic illustrations of variations of the two-way communication system of FIG. 1 where the mouthpiece component communicates with the infrastructure communications device via the relay component.

A second component of the communication system 80 may include the relay component where the relay component 12 of the communication system functions as an interface between the infrastructure communications device 14 (e.g., cell phone, walkie-talkie radios, intercom device, etc.) and the mouthpiece component 10, as shown in the illustrative drawing of FIG. 4A. The relay component 12 may convert the audio available at the infrastructure communication device into a wireless signal expected by the mouthpiece component 10, and vice-versa.

Depending on the wireless link type chosen between the mouthpiece component 10 and relay component 12, possible wireless links 84 between the mouthpiece component 10 and relay component 12 may include, e.g., Near Field Magnetic Induction (NFMI), body-conduction/body-network, a combination of these, or RF such as Bluetooth®. One link type is NFMI which enjoys relatively little attenuation through body tissue, and also has a low electromagnetic propagation for a low RF profile. For this implementation, the relay component 12 incorporates an inductive coil component which may be incorporated into the communications system. One variation may incorporate an antenna 82 configured as, e.g., a neck-loop or a patch-antenna. The direction of the magnetic field lines in relation to the mouthpiece antenna/coil, as illustrated in FIG. 2 above, may be taken into account when determining a location of the relay component NFMI antenna 82. For instance, neck-loop configurations may use a bolo-type cinching mechanism to tighten the loop around the neck and further has the benefit of changing the direction of the magnetic field lines, e.g., from forward tilting to more straight up towards the head which can give tighter coupling to the mouthpiece component 10 and a more robust wireless link. Loops may also be worn around the head of the user U and may be beneficial from this standpoint. Such loops may be integrated into any number of head-worn accessories, e.g., helmets, hats, etc. Neck-loops may also incorporate, e.g., a break-away connector feature for safety purposes.

Regardless of placement, it is advantageous to ensure there is some amount of separation between the antenna wire 82 and the human body (even if a few millimeters of separation), in order to preserve a higher Q (quality factor) of the antenna 82. In some variations, patch coils may be worn in various places but to ensure optimal field line position, the back of the neck or back of the head may work best. If NFMI is used at a fixed frequency, the magnetic field strength may be reduced in order to avoid user-to-user interference when multiple communication systems are worn in close proximity. Otherwise, time-sharing the bandwidth or utilizing dedicated frequency channels may be handled.

The wireless link 84 to the mouthpiece component 10 may be encrypted to ensure secure communications, e.g., using AES-256 or another chosen encryption algorithm. If unique encryption key-exchange is required, this may be achieved through an exchange over NFC or other close proximity-based method, between the mouthpiece component 10 and desired relay component 12, prior to use.

While the physical implementation of the relay component 12 may be a separate electronics enclosure with attached wireless link antenna to communicate with the mouthpiece component 10, other variations may have the relay component 12 physically mate and/or integrate with the infrastructure communication device 14 (described in further detail below). If the relay component 12 is a device physically separate from the infrastructure communication device 14, then a link 86 (either wired or wireless) may be established between the relay component 12 and infrastructure communication device 14. Since both devices would be outside of the body of the user, there are less restrictions on this link implementation, and protocols such as Bluetooth® or other RF communications may be used.

Figure 4B:
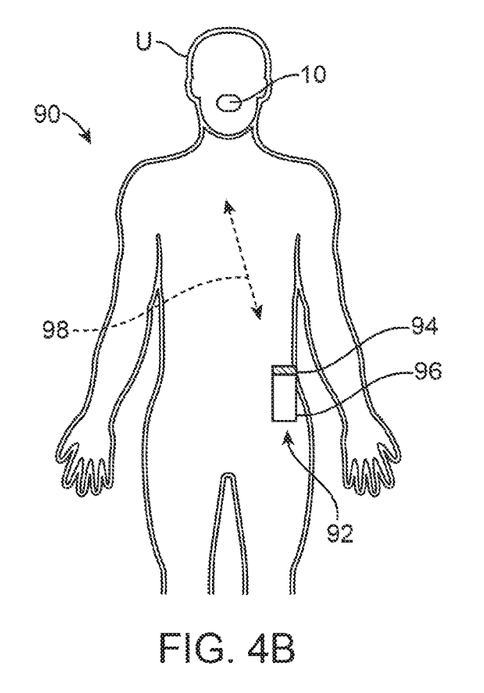

In the variation of the communication system 90 illustrated in FIG. 4B, the relay component 94 may be integrated into the infrastructure component 96, e.g., directly integrated into a case or housing such as a cell phone case, etc., such that a single integrated infrastructure communications device 92 may be used to communicate 98 wirelessly with the mouthpiece component 10.

Regardless of the specific chosen placement and implementation of the relay component 12, from a system level the relay component 12 may incorporate one or more processors for implementing digital signal processing (DSP) in order to minimize power consumption at the mouthpiece component 10. For a half-duplex system the DSP is not as critical as there is no feedback issue, but even basic filtering may be done at this point to save power.

Moreover, the relay component 12 may incorporate one or more user interface features which allow for the user U to interface with the system settings and modes, e.g., a push-to-talk (PTT) button for half-duplex audio communications and/or full-duplex communications (or to switch between half- and full-duplex communications), receive volume controls, etc. These controls may be integrated into the physical implementation of the relay component 12, or they may be separated out into a separate remote control with a new data link, such as Bluetooth® (e.g., Bluetooth® low-energy (BLE)), other RF link, an NFMI link, or simply a wired connection. An NFMI link which connects the relay component 12 with the remote control can desirably allow for better performance under water. Where an NFMI link is used with both the mouthpiece component 10 and the relay component 12, the mouthpiece and relay component NFMI links can each operate at a different frequency from one another, or the NFMI link for each can be time-shared/coordinated with each other such that a different frequency is not needed. For a wireless remote control, the implementation may be something physically similar to, e.g., a key-fob, to be worn in the pocket for easy concealment. More advanced devices could also provide system status information. Information sent to a smart watch would be one way to accomplish this.

The relay component 12 may either obtain power directly from the infrastructure communication device (if available), or be battery powered and require either battery replacements or recharge. An integrated rechargeable battery may be implemented for size reduction reasons. In order to recharge the device, one variation may utilize a break-away type feature of an NFMI neck-loop to access recharge contact pins, which are typically inaccessible during operation. In order to save power, when implementing a half-duplex system over a full-duplex infrastructure such as a cell phone, an audio-level sensor may be used to notify the system when it is able to transition into an idle mode (not actively transmitting or receiving audio).

Infrastructure Communication Device

As mentioned above, the communication system described may be used to interface with another infrastructure communication device such as a cell phone, radio, intercom device, etc. For wired connections to the relay component 12, audio in/out signals may be available, while wireless links such as Bluetooth® (e.g., Bluetooth® low-energy (BLE), other RF links, or NFMI links are also an option to use two-way audio data to shuttle between the relay component 12 and the infrastructure communication device 14. NFMI links can advantageously allow for under water usage. Where an NFMI link is used with both the relay component 12 and the infrastructure communication device 14, the relay component and infrastructure communication device NFMI links can each operate at a different frequency from one another, or the NFMI link for each can be time-shared/coordinated with each other such that a different frequency is not needed. If the device supports voice activated commands, these may be engaged using the audio over the described communication system components.

Additionally and/or optionally, the relay component 12 may also be implemented such that there are links to two or more separate infrastructure communication devices worn by the same user simultaneously (such as two radios used in tactical operations, to two different teams). Incoming audio is typically designated in current dual-communication systems by driving audio to either the right or left ear in a headset. For a system with a single mouthpiece, a pre-audio notification may be used to alert the user as to which device is the source of incoming audio. If a mouthpiece includes teeth-drive contact points on both the right and left sides of the mouth, audio may be phased to these drive points such that the perceived audio is coming from the right or left side.

All references including patent applications and publications cited herein are incorporated herein by reference in their entirety and for all purposes to the same extent as if each individual publication or patent or patent application was specifically and individually indicated to be incorporated by reference in its entirety for all purposes. Many modifications and variations of this invention can be made without departing from its spirit and scope, as will be apparent to those skilled in the art.

The specific embodiments described herein are offered by way of example only. Moreover, such devices and methods may be applied to other sites within the body. Modification of the above-described assemblies and methods for carrying out the invention, combinations between different variations as practicable, and variations of aspects of the invention that are obvious to those of skill in the art are intended to be within the scope of the claims.

What is claimed is:

1. A two-way communication system, comprising:
    a mouthpiece component having a housing which is configured for temporary securement upon a tooth or teeth of a user, wherein the housing has at least one integrated antenna, and wherein the housing has an actuator configured to provide bone conduction sound transmission into the tooth or teeth of the user;
    an infrastructure communication device configured to transmit or receive signals from the mouthpiece component to a remote communication device; and
    a relay component in communication with the mouthpiece component and configured to interface between the mouthpiece component and the infrastructure communication device,
    wherein the mouthpiece component further comprises a microphone integrated within the housing,
    wherein the housing has a housing first portion and a housing second portion, wherein the housing first portion has the microphone and the housing second portion has the actuator, wherein the housing first portion and the housing second portion are configured to be on opposite sides of the tooth or teeth when the housing is secured to the tooth or teeth, and wherein the housing second portion is configured to contact the tooth or teeth when the housing is secured to the tooth or teeth.

2. The system of claim 1 wherein the at least one integrated antenna is configured to be insensitive to positioning upon a left or right side of the dentition.

3. The system of claim 1 wherein the at least one integrated antenna is configured for near field magnetic induction.

4. The system of claim 1 wherein the at least one integrated antenna comprises a wire-wound ferrite core or wide loop antenna.

5. The system of claim 1 wherein the microphone comprises a MEMS-type air microphone.

6. The system of claim 1 further comprising an attenuation element in vibrational communication with the microphone.

7. The system of claim 1 wherein the housing defines air cavity in communication with the microphone.

8. The system of claim 1 further comprising a PVDF film vibrational sensor integrated within the housing.

9. The system of claim 1 further comprising a power supply integrated within the housing.

10. The system of claim 1 wherein the infrastructure communication device is configured to transmit or receive communications wirelessly.

11. The system of claim 1 wherein the relay component is wirelessly in communication with the infrastructure communication device via near field magnetic induction.

12. The system of claim 1 further comprising an antenna in proximity to the relay component and configured as a loop configuration.

13. The system of claim 1 wherein the relay component is integrated with the infrastructure component.

14. The system of claim 1 further comprising a system control in communication with the relay component.

15. The system of claim 1 wherein the microphone is configured to capture the user's speech for outgoing audio transmissions, and wherein the actuator is configured to vibrate against the tooth or teeth to provide the user with incoming audio transmissions via bone conduction.

16. The system of claim 1 wherein when the housing is secured to the tooth or teeth, the housing first portion is configured to contact the user's palate and the housing second portion is configured to contact an inner surface of a cheek of the user.

17. The system of claim 1 wherein when the housing is secured to the tooth or teeth, the housing first portion is on a buccal side of the tooth or teeth and the housing second portion is on a lingual side of the tooth or teeth.

18. The system of claim 1 wherein when the housing is secured to the tooth or teeth, the housing first portion is on a lingual side of the tooth or teeth and the housing second portion is on a buccal side of the tooth or teeth.

19. The system of claim 1 wherein the housing second portion has a tooth contact portion configured to fit in an interproximal space between two adjacent teeth.

20. The system of claim 1 wherein the housing first portion is coupled to the housing second portion via a connector, and wherein the connector extends partially around a posterior-most tooth of the tooth or teeth when the housing is secured to the tooth or teeth.

21. The system of claim 1 wherein the housing has a housing first configuration and a housing second configuration, wherein the tooth or teeth of the user are on a left side of the user's dentition or on a right side of the user's dentition, wherein when the housing is in the housing first configuration, the housing is securable to the tooth or teeth on the left side of the user's dentition, and wherein when the housing is in the housing second configuration, the housing is securable to the tooth or teeth on the right side of the user's dentition.

22. The system of claim 1 wherein the housing is securable to the tooth or teeth of the user with an interference fit.

23. The system of claim 1 wherein when the housing is secured to the tooth or teeth, occlusal surfaces of the tooth or teeth remain unobstructed by the housing.

24. The system of claim 23 wherein when the housing is secured to the tooth or teeth, the housing allows for normal speech, eating, and drinking without impediment.

25. The system of claim 1 wherein the relay component is configured to be worn around the user's neck or around the user's head.

26. A two-way communication system, comprising:
a mouthpiece component having a housing which is configured for temporary securement upon a tooth or teeth of a user, wherein the housing has at least one integrated antenna, and wherein the housing has an actuator configured to vibrate against the tooth or teeth to provide the user with incoming audio transmissions via bone conduction;
an infrastructure communication device configured to wirelessly transmit or receive signals from the mouthpiece component to a remote communication device;
a relay component in communication with the mouthpiece component and configured to wirelessly interface between the mouthpiece component and the infrastructure communication device; and
a system control in communication with the relay component and configured to wirelessly provide an input to the relay component,
wherein the housing has a housing first portion and a housing second portion, wherein the housing first portion has a microphone and the housing second portion has the actuator, wherein when the housing is secured to the tooth or teeth, the housing second portion is configured to contact the tooth or teeth, wherein when the housing is secured to the tooth or teeth, the housing first portion is configured to be on a lingual side of the tooth or teeth and the housing second portion is configured to be on a buccal side of the tooth or teeth, wherein the housing second portion has a tooth contact portion configured to fit in an interproximal space between two adjacent teeth, wherein the tooth contact portion is configured to vibrate to transmit audio signals into the tooth or teeth, wherein the housing first portion is coupled to the housing second portion via a connector, and wherein the connector extends partially around a posterior-most tooth of the tooth or teeth when the housing is secured to the tooth or teeth.

27. The system of claim 26 wherein the microphone is configured to capture sound for outgoing audio transmissions.

28. The system of claim 26 wherein the relay component is configured to be worn by the user.

29. The system of claim 26 wherein the housing is securable to the tooth or teeth of the user with an interference fit, or wherein when the housing is secured to the tooth or teeth, an occlusal surface of the tooth or teeth remain unobstructed by the housing.

* * * * *